Figure 1:
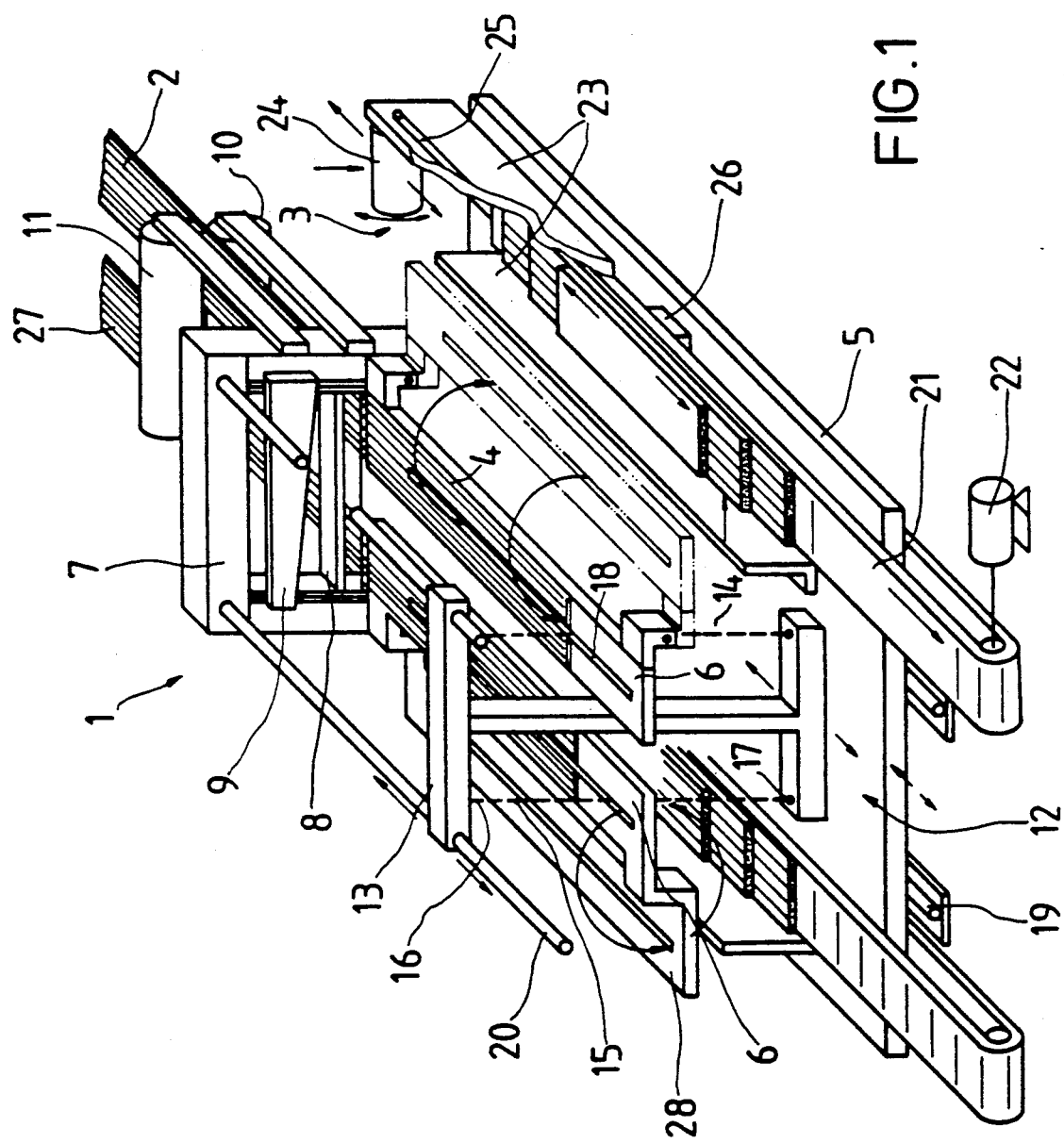

United States Patent [19]

Minor et al.

[11] Patent Number: 5,096,531

[45] Date of Patent: Mar. 17, 1992

[54] APPARATUS FOR FABRICATING STRUCTURAL COMPONENTS FROM LAMINATED TAPE MATERIAL

[75] Inventors: Roman Minor, Laumersheim; Herbert Woltron, Worms, both of Fed. Rep. of Germany

[73] Assignee: BASF Aktiengesellschaft, Ludwigshafen, Fed. Rep. of Germany

[21] Appl. No.: 500,938

[22] Filed: Apr. 26, 1990

[30] Foreign Application Priority Data

Apr. 27, 1989 [DE] Fed. Rep. of Germany ....... 3913836

[51] Int. Cl.⁵ .............................................. B32B 31/18
[52] U.S. Cl. ..................................... 156/353; 156/260; 156/264; 156/512; 156/516; 156/517
[58] Field of Search ............... 156/264, 260, 353, 512, 156/510, 516, 517

[56] References Cited

U.S. PATENT DOCUMENTS

| | | | |
|---|---|---|---|
| 2,734,843 | 2/1956 | Steele | 156/512 |
| 3,147,166 | 9/1964 | Friday | 156/264 |
| 3,819,448 | 6/1974 | Beever | 156/355 |
| 4,288,280 | 9/1981 | Morin | 156/517 |

Primary Examiner—Caleb Weston
Attorney, Agent, or Firm—Keil & Weinkauf

[57] ABSTRACT

A continuous fully mechanized fabrication of structural components from layered tape sections, for example from fiber composite material, is possible with an apparatus comprising a cutting means with at least one support plate which is movable forward and backward alongside a moving starting material in tape form synchronously therewith, and a depositing and stacking unit which is movable together with said cutting means and in the direction of which the support plate is pivotable and which is positionable relative to the support plate.

10 Claims, 2 Drawing Sheets

APPARATUS FOR FABRICATING STRUCTURAL COMPONENTS FROM LAMINATED TAPE MATERIAL

The present invention relates to an apparatus for fabricating structural components of laminated sections from continuously arriving laminated tape material.

The fully mechanized fabrication of structural components from layered tape material, for example precursors for leaf springs from fiber composites, requires for a continuous production process that all the fabrication units must be adapted to one another in such a way that the tape material which is produced at a constant speed can be processed into structural component precursors at a rate per unit time which corresponds to the operating speed of a machine, for example a press, which joins the precursors together.

It is an object of the present invention to provide an apparatus for fabricating the structural components from laminated tape material where the cutting of the tape material and the stacking of the tape sections into structural component precursors are adapted to the continuous arrival of the tape material and to the subsequent semicontinuous further processing of the precursors. It should be specifically possible not only to have different section lengths within a stack but also to produce components which are different in all dimensions.

We have found that this object is achieved by an apparatus comprising a cutting means for the tape material and support means therefor, an equalizing means for the tape advance which is interrupted during the cutting process, and—associated with the support means—a length measuring means for the tape sections to be separated off, and also a depositing and stacking unit which is positionable relative to the support means and—associated therewith—a transfer means for the tape sections.

Figure 2:
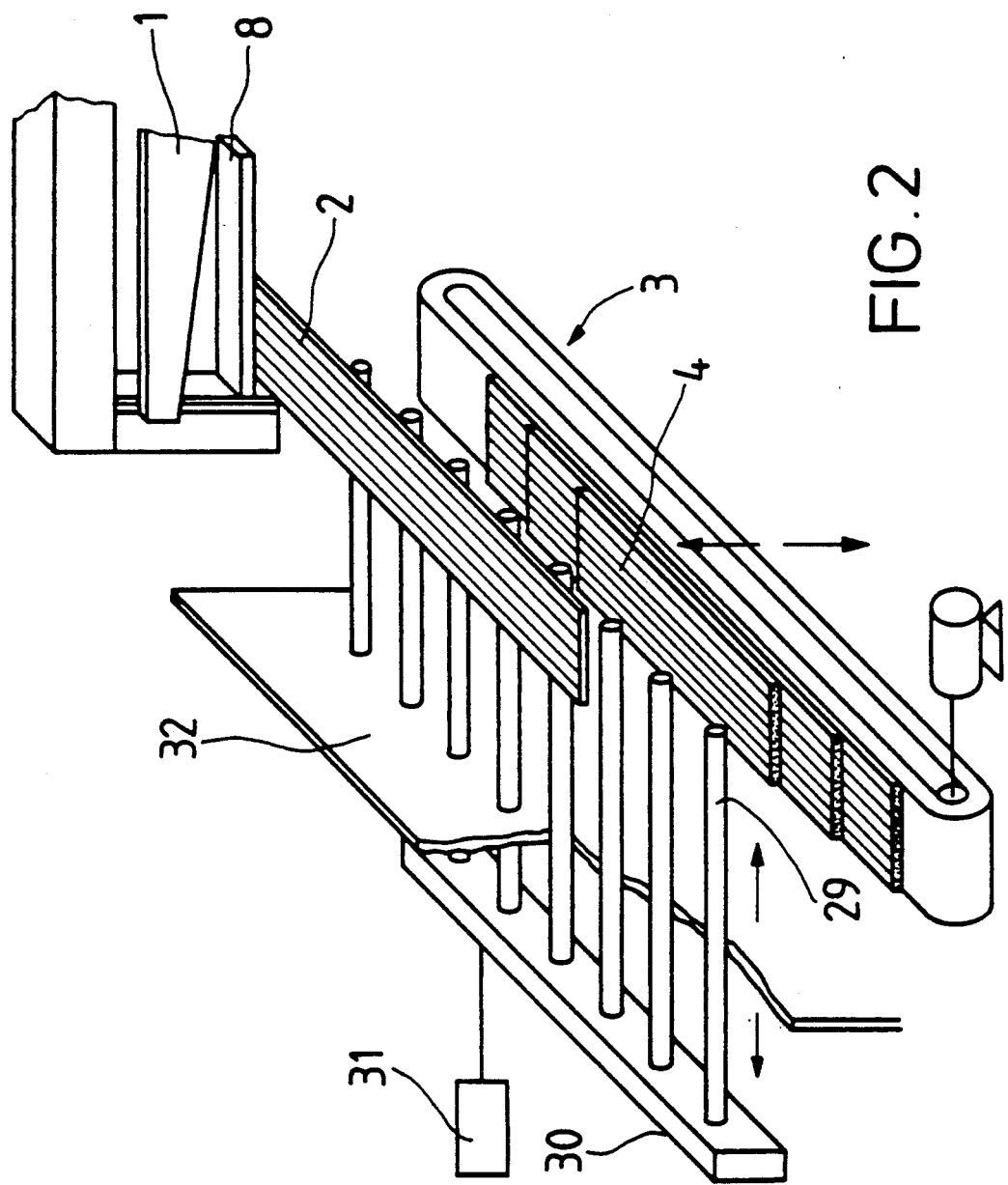

Further details and advantages of the apparatus according to the present invention will now be described in more detail with reference to an illustrative embodiment depicted in the drawing, where FIG. 1 shows the apparatus as a whole and FIG. 2 shows an arrangement of support rods (detail).

The apparatus consists essentially of two functional units (FIG. 1): a cutting means 1 for the continuously arriving tape material 2, in the present illustrative embodiment a tape of fiber composite, namely a prepreg tape, and a depositing and stacking unit 3 for tape sections 4, said functional units being mounted on a common base plate 5.

The cutting means 1 has a first, elongate support plate 6 for the tape material 2 arriving from a production plant through a frame 7 within which a clamping strip 8 and a blade 9 are movable in a downward direction by an operating cylinder (not depicted) customary for such cutting mechanisms.

The length of the sections to be trimmed off from tape 2 which is transported by a pair of rolls 10 and 11 and moves continuously across the support plate 6 can be determined via the revolutions of the transportation rolls or, as in the present illustrative embodiment, with the aid of a length measuring means 12 comprising a holder 13 supporting a signal barrier 14, for example a light barrier, which includes the support plate. To allow the light beam 15 to pass from a light source 16 to a photocell 17 the support plate has a longitudinal slot 18.

As soon as the tape material arrives at the light barrier, the photocell activates the drive for the clamping strip 8 and the blade 9. During cutting, the cutting device moves together with the tape. To this end, the base plate 5 is mounted, for example on linear ball bearings 19, so as to be movable in the tape transport direction and is connected to a drive, for example a servomotor, which is activated as soon as the clamping strip touches the tape.

The holder 13 for the signal barrier 14 is slidable on the base plate 5 along the support plate 6, being carried for example by rods 20 which are attached to the frame 7 and act as longitudinal guides, in order that the length of the tape sections 4 may be varied.

The same base plate 5 supports the depositing and stacking unit 3, so that the latter remains coordinated with the support plate 6 even during movement of the cutting means 1. Said unit 3 can consist for example of a receiving plate which is positionable parallel to the support plate and which for discharging the ready-produced stack, the structural component precursor, is connected by means of a transfer station to a transportation means leading to a press In the depicted illustrative embodiment, the tape sections 4 are received by a conveyor belt 21 which is arranged at the side of the support plate 6 and is movable parallel thereto and which has a controllable drive 22 toward which the support plate is pivotable and which coordinates in the stacking zone with abutment plates 23 on both sides for the lateral alignment of the sections. One of the two abutment plates is movable sideways toward the conveyor belt. By moving the conveyor belt in a controlled manner it is possible to set the particular desired depositing position for each tape section. The ready-produced stack is then conveyed by the conveyor belt for further processing or toward a further transportation means.

It is advisable to equip the depositing and stacking unit 3 with a contact roll 24 guided in a recess 25 along the conveyor belt 21 and movable in reverse by across the stack by a linear drive. This makes it possible to compact the tape sections 4 during stacking. The contact pressure is generated by an operating cylinder.

The weight of the stack of sections relative to the basis weight of the tape material is a measure of the quality of the structural component product. To measure the stack weight the conveyor belt is therefore guided across suitable weighing means 26 operated by the customary difference measurement method. Suitable weighing means are commercially available, so that they need not be described here Weight determination before the stacking process has ended permits correction by adding or omitting sections 4.

After a tape section has been deposited the support plate 6 pivots back into the starting position. Similarly, the previously moving base plate 5 returns with all the devices into the starting position for the next cutting and stacking process. This operation must be concluded before the still moving tape material 2 reaches the light barrier 14. If very short tape sections make it likely that there will be a buildup of tape, suitable compensating means, such as jockey rolls or controllable loop buffers, can be provided upstream of the cutting means.

The swinging back of the support plate can be omitted if, as shown in the drawing for a second tape material 27, a second support plate 28 is connected to the first in an axially symmetrical and parallel arrangement. Accordingly, after the first support plate 6 has been pivoted toward the conveyor belt, the second plate 28 is ready for receiving the next tape section.

Instead of the support plate 6 it is also possible to provide a number of rods 29 (FIG. 2) which are arranged in succession and transversely to the tape transport direction and which are slidable out of the transport path of the tape material 2 via a support rail 30 and by means of an operating cylinder 31. A stop strip 32 is provided for brushing the tape sections 4 off the rods and onto a vertically adjustable depositing and stacking unit 3 arranged underneath. It is of course also possible for the rods to be mounted pivotally or, conversely, for the support plate 6 to be made slidable.

Furthermore, instead of the slidable mounting for the cutting device and the support means 6, 29 a controllable tape loop section can be provided upstream of the cutting means to equalize the tape advance interrupted by the cutting operation.

To control the drives for the above-described machine units it is possible to use commercially available equipment, so that this matter need not be discussed here in any further detail.

We claim:

1. Apparatus for the continuous fabricating of structural components of laminated sections from continuously arriving laminated tape materials, comprising:
    a cutting unit including a cutting means for the tape material and a support therefor, which cutting means separates a section of tape material of the desired length from the continuously advancing tape material once the desired length of has passed therethrough,
    an equalizing means for the continuously advancing tape which is interrupted during the cutting by the cutting means,
    a length measuring means for the tape sections to separated off, which length measuring means, once the desired length has been reached, signals the cutting station to commence its operation, and
    a depositing and stacking unit positioned relative to the support which is activated once the desired lengths of the tape material are separated from the continuously advancing tape material, and which includes a transfer means positioned to carry off the separated lengths of tape material.

2. Apparatus as in claim 1, wherein the cutting unit is movable forward and backward along the direction of the continuously moving tape material synchronously therewith, and the depositing and stacking unit is movable together with the cutting unit.

3. Apparatus as claimed in claim 1, wherein the cutting unit is in a stationary arrangement and there is a controllable tape loop section upstream of the cutting means.

4. Apparatus as claimed in claim 1, wherein the support means and transfer means consist of at least one support plate which is pivotable toward the depositing and stacking unit.

5. Apparatus as claimed in claim 4, wherein a second support plate is provided parallel to the first one in an axially symmetrical arrangement.

6. Apparatus as claimed in claim 1, wherein the support means and transfer means consist of a number of rods arranged in succession and transversely to the tape transport direction and which are movable out of the transport path.

7. Apparatus as claimed in claim 1, wherein the length measuring means comprises a signal barrier which includes the support means and is positionable in the longitudinal direction thereof and which activates the cutting means.

8. Apparatus as claimed in claim 1, wherein the depositing and stacking unit is equipped with a contact roll which is movable across the stack of tape sections.

9. Apparatus as claimed in claim 1, wherein the depositing and stacking unit is connected to a weighing means.

10. Apparatus as in claim 1 wherein the transfer means includes a conveyor belt for carrying off the separated lengths of tape material, which transfer means is movable alongside the support means.

* * * * *